United States Patent [19]
Cheng et al.

[11] Patent Number: 6,131,643
[45] Date of Patent: Oct. 17, 2000

[54] SUN SHIELD DEVICE FOR PARKED AUTOMOBILE

[75] Inventors: Carson Jun Ping Cheng; Guo Ping Cui; Yong Ming Sui; Cady Lan Yu Cheng, all of Alhambra, Calif.

[73] Assignee: New Century Sci & Tech, Inc., Alhambra, Calif.

[21] Appl. No.: 09/193,156

[22] Filed: Nov. 17, 1998

[51] Int. Cl.⁷ .................................................. B60J 11/00
[52] U.S. Cl. .................. 160/370.22; 160/24; 160/323.1; 296/98; 296/136
[58] Field of Search .......................... 160/370.22, 323.1, 160/324, 325, 326, 317, 24, 25, 264; 296/37.16, 95.1, 97.8, 97.9, 98, 142, 143, 136; 135/88.07, 88.08, 88.09; 150/166

[56] References Cited

U.S. PATENT DOCUMENTS

| | | | |
|---|---|---|---|
| 872,322 | 12/1907 | Atherton | 160/326 |
| 1,054,535 | 2/1913 | Grigg | 160/323.1 |
| 1,057,603 | 4/1913 | Whitney | 160/326 X |
| 1,203,455 | 10/1916 | Baker | 160/325 |
| 3,021,894 | 2/1962 | Due | 160/370.22 X |
| 3,220,464 | 11/1965 | Wise | 160/24 |
| 3,292,684 | 12/1966 | Jines | 160/370.22 X |
| 4,262,955 | 4/1981 | Duda | 296/37.16 X |
| 4,373,569 | 2/1983 | Barettella | 160/323.1 X |
| 4,834,160 | 5/1989 | Becker | 160/264 X |
| 4,848,823 | 7/1989 | Flohr et al. | 296/98 |
| 4,958,881 | 9/1990 | Piros | 160/370.22 X |
| 5,022,700 | 6/1991 | Fasiska et al. | 160/370.22 X |
| 5,056,839 | 10/1991 | Yoon | 160/370.22 X |
| 5,294,167 | 3/1994 | Yu | 296/98 |
| 5,378,035 | 1/1995 | Wu | 296/98 X |
| 5,456,515 | 10/1995 | Dang | 160/370.22 X |
| 5,597,196 | 1/1997 | Gibbs | 160/326 X |

*Primary Examiner*—David M. Purol
*Attorney, Agent, or Firm*—Raymond Y. Chan; David and Raymond

[57] ABSTRACT

A sun shield device for automobile includes a tubular central axle, a revolving sleeve which has a diameter larger than and a length shorter than that of the central axle being rotatably supported around the central axle, a shading sheet engaged on and wound around the revolving sleeve, an auto-rewinding device which is installed between the central axle and the revolving sleeve for driving the revolving sleeve to rotate so as to automatically rewind the shading sheet around the revolving sleeve, a supporting device including a pair of supporters extendably connected to two ends of the central axle respectively, and an adjusting device for adjusting the length of at least one of the supporters so as to adjust an overall length of the sun shield device until two supporting end members of the two supporters respectively firmly pressed against two interior side walls of a trunk of an automobile so as to horizontally support the sun shield device within the trunk. Whereby, the user may simply open the trunk cover and pull the shading sheet from the revolving sleeve out of the trunk through the gap formed between the opened trunk cover and trunk edge for at least covering the roof of the automobile.

12 Claims, 9 Drawing Sheets

SUN SHIELD DEVICE FOR PARKED AUTOMOBILE

FIELD OF THE PRESENT INVENTION

The present invention relates to sun shading, and more particularly to a sun shield device for automobile, which fits to install inside the trunk automobile without any additional connecting element such as screw in order to avoid the automobile body from being unnecessarily damage.

BACKGROUND OF THE PRESENT INVENTION

There are many types of vehicle sun shield device. A kind of vehicle cover, which utilizes a tent-like structure to cover the whole vehicle, is well known in the art. Although it successfully shields the whole vehicle from direct sunshine, it is difficult to remove from the vehicle and is inconvenient to store them in the vehicle. Therefore, such tent-like vehicle cover is not suitable to be used for temporarily parked automobile.

The common feature of sun shield for temporarily parking is that the sun shield device must be easy to operate. To achieve the above goal, conventional sun shields for vehicle comprises a housing for securing on top of the vehicle and a sheet material which is wound and received within the housing. The sheet material can be unwound from the housing for covering the vehicles. However, the housing is exploded outside the vehicle that not only adversely affects the appearance of the vehicle but also can easily be stolen.

The recent sun shield devices are designed to be installed inside the trunks of the vehicles so as to hide the devices when they are not in use. Some of them include a housing affixed in the trunk by screwing. Some of them include a motor to operate the winding or unwinding of a shading sheet received within the housing. Holes must be drilled inside the trunk in order to install the sun shield device. However, most of the car owners are unwilling to have any damage to their cars just for installing a sun shield device. Besides, when a motor is used, the installation cost increases for connecting the electrical power thereto. Moreover, there are many different styles of vehicle each having a different size and shaped trunk, and therefore each sun shield device is custom made to fit the particular kind of vehicle only. Also, since many people own more than one car, it is impossible for the driver to selectively interchange the conventional sun shield device from one car to another when the driver changes his or her car to drive.

SUMMARY OF THE PRESENT INVENTION

It is thus a first object of the present invention to provide a sun shield device for automobile, which that fits to install inside the trunk of various kinds of automobile without any additional connecting element such as screw, in order to avoid the automobile body from being unnecessarily damage.

A further object of the present invention is to provide a sun shield device for automobile wherein the driver can install or uninstall the sun shield device rapidly without the need of any tool or technical skill, so that when the driver changes car to drive, he or she may also carry the sun shield device to re-install to the new car.

Yet another object of the present invention is to provide a sun shield device for automobile, which can be effectively operated to cover all the window areas and the roof of the automobile in a rapid manner.

Still another object of the present invention is to provide a sun shield device for automobile, which has a compact size and simplified structure that minimizes the manufacturing cost.

In order to accomplish the above objects, the present invention provides a sun shield device for automobile, which comprises a tubular central axle, a revolving sleeve which has a diameter larger than and a length shorter than that of the central axle being rotatably supported around the central axle, a shading sheet engaged on and wound around the revolving sleeve, an auto-rewinding means which is installed between the central axle and the revolving sleeve for driving the revolving sleeve to rotate so as to automatically rewind the shading sheet around the revolving sleeve, a supporting means comprising a pair of supporters extendably connected to two ends of the central axle respectively, and an adjusting means for adjusting the length of at least one of the supporters so as to adjust an overall length of the sun shield device until two supporting end members of the two supporters respectively and firmly pressed against two interior side walls of a trunk of an automobile so as to horizontally support the sun shield device within the trunk.

Whereby, the user may simply open the trunk cover and pull the shading sheet from the revolving sleeve out of the trunk through the gap formed between the opened trunk cover and trunk edge for at least covering the roof of the automobile.

DETAILED DESCRIPTION OF THE PREFERRED EMBODIMENTS

Figure 1:
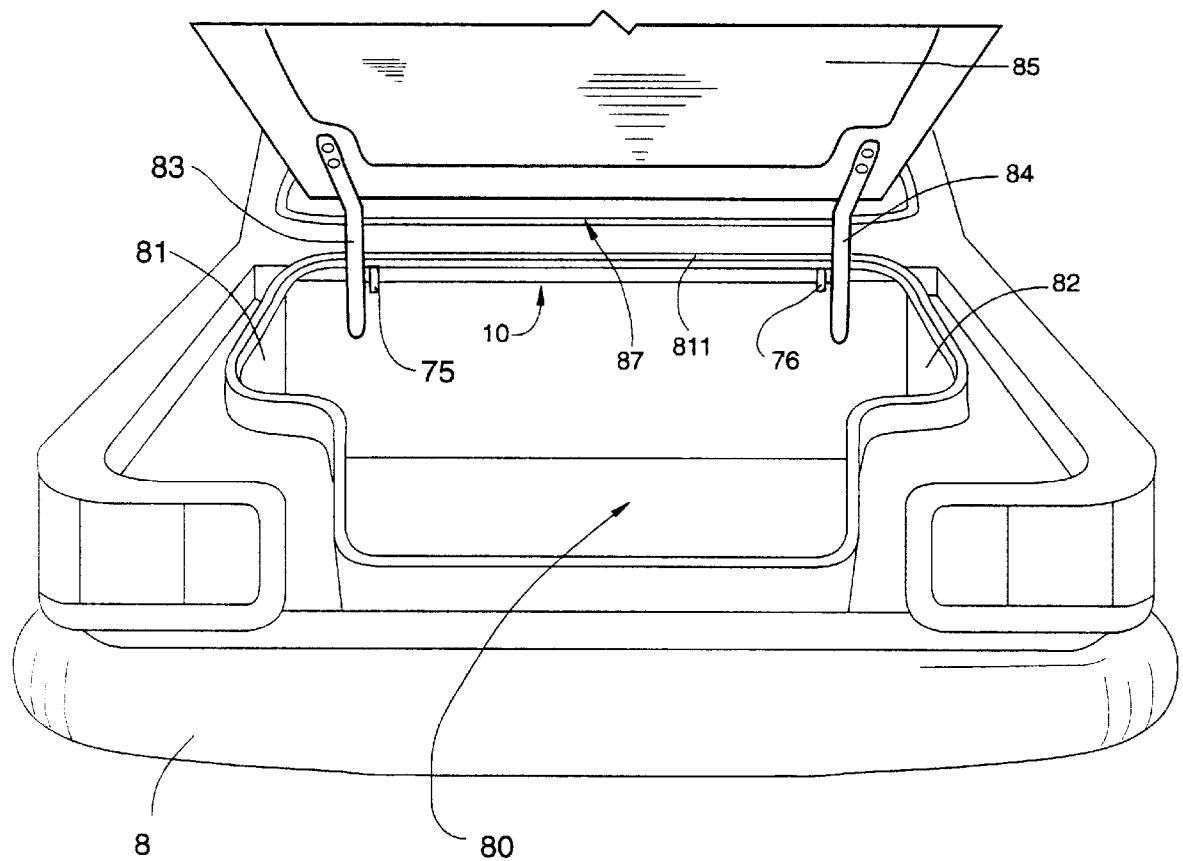
FIG. 1 is an elevation view of a sun shield device installed inside a trunk of an automobile according to a first preferred embodiment of the present invention.
Figure 2:
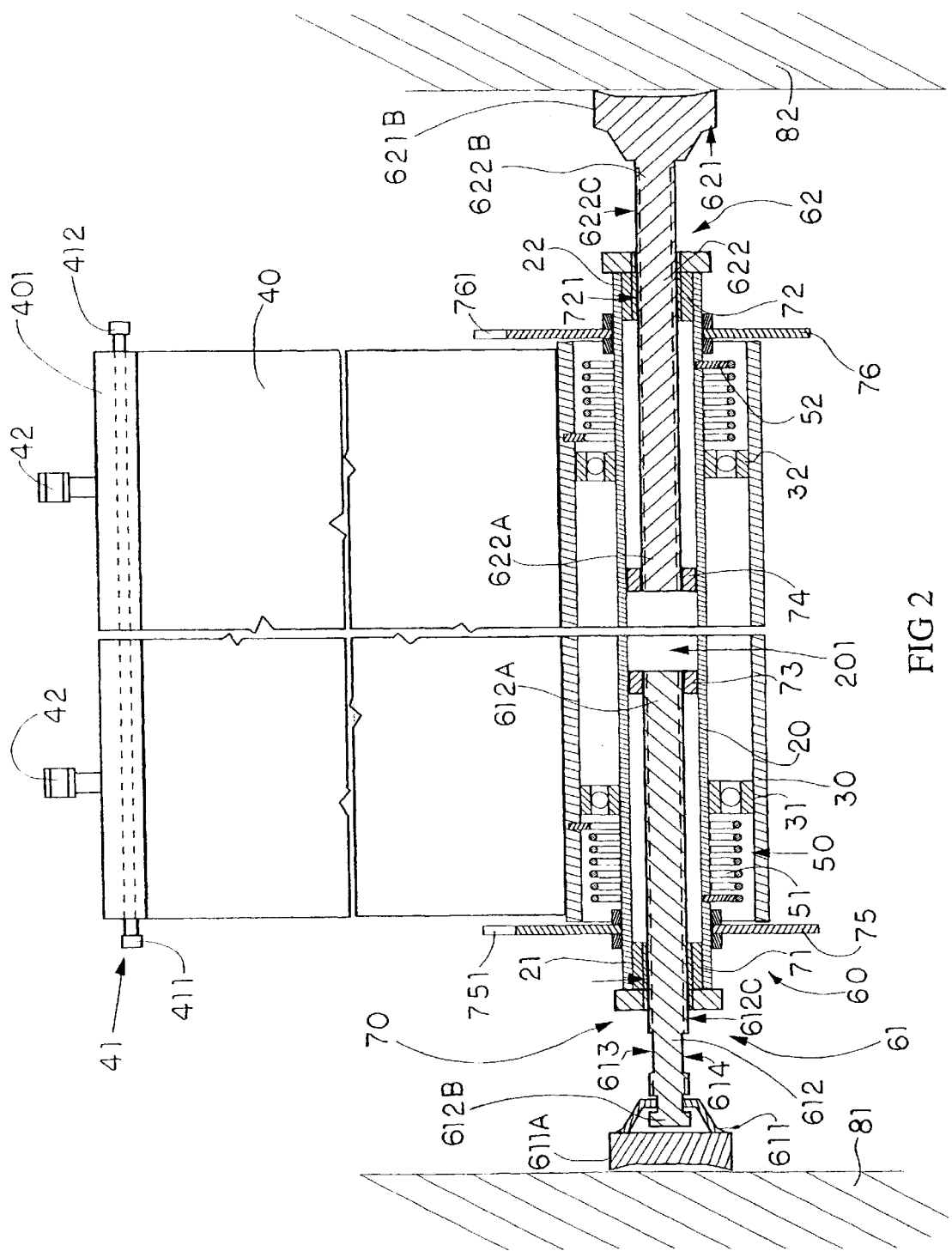
FIG. 2 is a sectional view of the sun shield device according to the above first preferred embodiment of the present invention.
Figure 3:
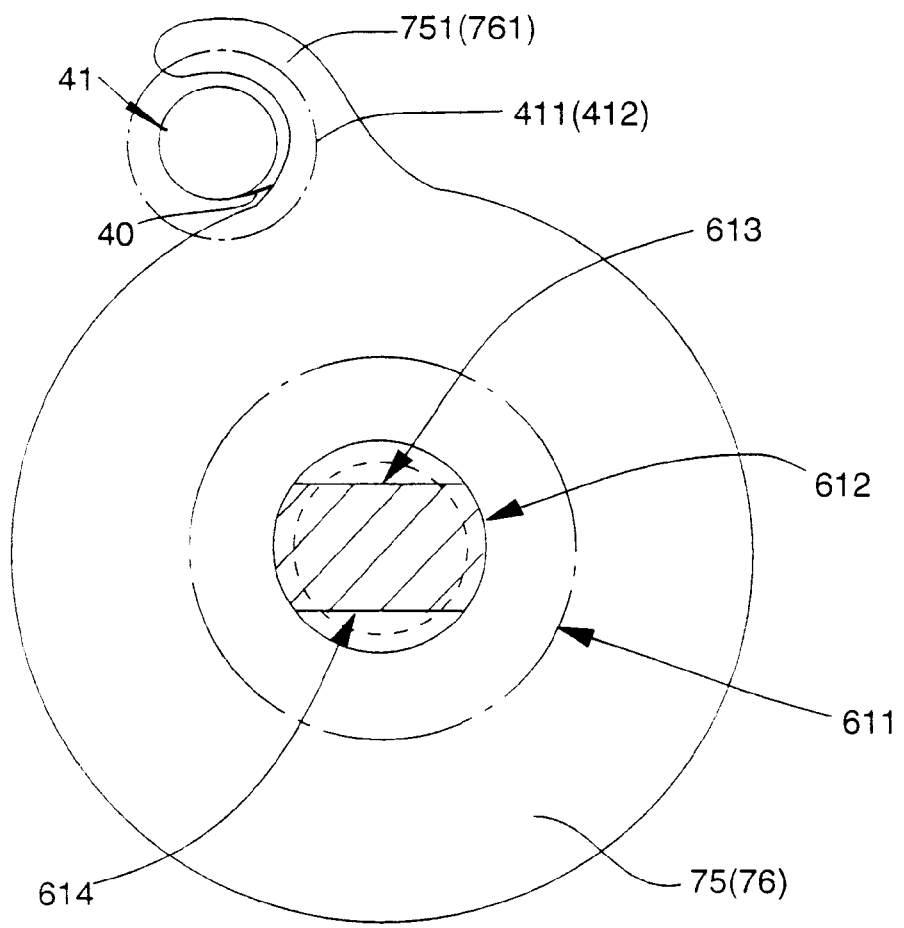
FIG. 3 is an end view of the sun shield device, illustrating how the pair of stopper rings hold the end stick of the shading sheet, according to the above first preferred embodiment of the present invention.

Referring to FIGS. 1 to 3, a sun shield device 10 for automobile according to a first preferred embodiment of the present invention is illustrated. The sun shield device 10 comprises a tubular central axle 20 having an axial hole 201; a revolving sleeve 30, which has a diameter larger than and a length shorter than that of the central axle 20, being rotatably supported around the central axle 20; a shading sheet 40 having a width equal to or slightly smaller than the length of the revolving sleeve 30 and a first end connected to the revolving sleeve 30; an auto-rewinding means 50 which is installed between the central axle 20 and the revolving sleeve 30 for driving the revolving sleeve 30 to rotate so as to automatically rewind the shading sheet 40 around the revolving sleeve 30; a supporting means 60 comprising a pair of supporters 61, 62 extendably connected to two ends 21, 22 of the central axle 20 respectively; and an adjusting means 70 for adjusting the length of at least one of the supporters 61, 62 so as to adjust an overall length of the sun shield device 10 until two supporting end members 611, 621 of the two supporters 61, 62 firmly pressing against two interior side walls 81, 82 of a trunk 80 of an automobile 8 respectively so as to horizontally support the sun shield device 10 within the trunk 80, as shown in FIGS. 1 and 2.

As shown in FIG. 2, two bearings 31, 32 are respectively engaged at two end portions of the central axle 20 so as to coaxially support the revolving sleeve 30 around the central axle 20 and to enable the revolving sleeve 30 to rotate about the central axle 20.

The auto-rewinding means 50 comprises at least one coil spring disposed in the cavity defined between the central axle 20 and the revolving sleeve 30, wherein one end of the coil spring is affixed to the central axle 20 while another end of the coil spring is affixed to the revolving sleeve 30, so that when the shading sheet 40 is pulled out by a pulling force, the revolving sleeve 30 will rotate with respect to the central axle 20 and the coil spring will be driven to turn tight and reserve a rewinding energy. Then, when the pulling force is released so that the rotation force applied to the revolving sleeve 30 is released too, the tightly turned coil spring will drive the revolving sleeve 30 to automatically rotate in opposite direction.

As shown in FIG. 2, according to the first preferred embodiment of the present invention, the auto-rewinding means 50 comprises a pair of coil springs 51, 52 each having a diameter larger than an exterior diameter of the central axle 20 but smaller than an interior diameter of the revolving sleeve 30. The two coil springs 51, 52 are respectively disposed inside two ends of the revolving sleeve 30. One end of each of the coil springs 51, 52 is affixed to the central axle 20 while another end of that coil spring 51, 52 is affixed to the revolving sleeve 30. The use of the two coil springs 51, 52 can provide strengthened rewinding force for the revolving sleeve 30 more evenly, so as to ensure the two sides of the shading sheet 40 to be rewound around the revolving sleeve 30 at the same speed evenly and precisely. Therefore, when the shading sheet 40 is pulled out by a pulling force, the revolving sleeve 30 will rotate with respect to the central axle 20 and the two coil springs 51, 52 will be driven simultaneously to turn tight and reserve a rewinding energy. Then, when the pulling force is released wherein the rotation force applied to the revolving sleeve 30 is released too, both the tightly turned coil springs 51, 52 will drive, at the same time, the revolving sleeve 30 to automatically rotate in opposite direction.

End of the two supporters 61, 62 comprises a supporting shaft 612, 622. Each of the supporting shafts 612, 622 has a first end 612a, 622a and a second end 612b, 622b. The two first ends 612a, 622a of the two supporting shafts 612, 622 are respectively inserted into the axial hole 201 of the central axle 20 through the two ends 21, 22 thereof. The second end 612b of one of the two supporting shafts 612, 622 is rotatably connected with the supporting end member 611 and the second end 622b of the another supporting shaft 622 is integrally connected with the supporting end member 621. Each of the two supporting end members 611, 621 has an enlarged supporting head 611a, 621a to increase the contact area with respect to the interior side wall 81, 82 of the trunk 80, so that a better supporting ability can be ensured by increasing the frictional force between the supporting head 611a, 621a and the two interior side walls 81, 82.

Each of the supporting shafts 612, 622 has a length slightly longer than half the length of the central axle 20, so that when the two supporting shafts 612, 622 are not in use, they can be inserted into the axial hole 201 of the central axle 20 in order to reduce the overall size of the sun shield device 10 of the present invention for easy carrying and storage.

In order to reduce the friction between the two supporting shafts 612, 622 and the interior wall of the central axle 20, the supporting shafts 612, 622 are sliding along the axial hole 201, wherein the diameter of the two supporting shafts 612, 622 are preferred to be smaller than the diameter of the axial hole 201. The adjustment means 70 comprises two holding rings 71, 72 respectively engaged to the two ends 21, 22 of the central axle 20. Each of the holding rings 71, 72 has a holding hole 711, 721 which has a diameter equal to the diameter of the two supporting shafts 612, 622, so that the two supporting shafts 612, 622 respectively pass through the two holding rings 71, 72. Each of the two first ends 612a, 622a of the two supporting shafts 612, 622 is further secured with an enlarged supporting ring 73, 74 which is slidably disposed inside the axial hole 201 of the central axle 20. Each of the supporting rings 73, 74 has an outer diameter equal to the interior diameter of the axial hole 201. Therefore, the two supporting shafts 612, 622 are coaxially supported by the two holding rings 71, 72 and the two supporting rings 73, 74 respectively.

According to the preferred embodiment as shown in FIG. 2, each of the two supporting shafts 612, 622 is provided with an outer threaded portion 612c, 622c along its length. Moreover, both the holding holes 711, 721 of the two holding rings 71, 72 are threaded holes. In other words, the two supporting shafts 612, 622 are respectively screwed through the two threaded holding holes 711, 721 of the two holding rings 71, 72. Therefore, by screwing the two supporting shafts 612, 622 into the central axle 20 or out of the central axle 20 can adjust distance between the two supporting end members 611, 612, i.e. adjusting the overall length of the sun shield device 10 of the present invention.

Figure 4:
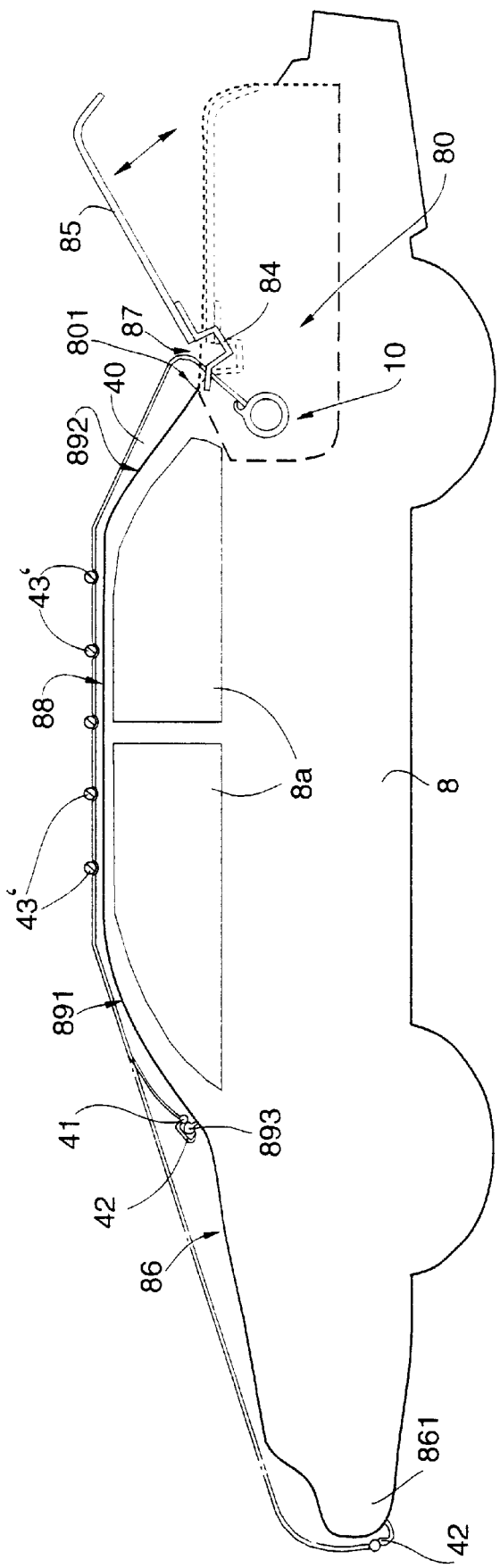
FIG. 4 is a side view of the automobile shaded by the sun shield device according to the above first preferred embodiment of the present invention.

As mentioned above, the width of the shading sheet 40 is equal to or slightly smaller than the width of revolving sleeve 30. The shading sheet 40 is preferably made of heat insulating material and/or coated with solar reflecting substance thereon. As shown in FIG. 4, the shading sheet 40 has a predetermined length that is long enough to extend from inside the trunk 80 to the front engine cover 86 of the automobile 8 (as shown in FIG. 4).

A supporter bar 41 is transversely affixed to a free end 401 of the shading sheet 40. The supporter bar 41 has a length longer than the width of the shading sheet 40 so that two end heads 411, 412 of the supporter bar 41 are respectively extended out of the two sides of the free end 401 of the shading sheet 40. At least a holder 42 is connected to the free end 401 of the shading sheet 40.

Adjacent to the two ends of the revolving sleeve 30, two guider discs 75, 76 are respectively mounted on the central axle 20 for guiding the winding of the shading sheet 40 around the revolving sleeve 30. As shown in FIGS. 2 and 3, each of the two guider discs 75, 76 has a hook-shaped stopper 751, 761, wherein when the shading sheet 40 is rewound around the revolving sleeve 30 by means of the auto-rewinding means 50, two ends of the supporter bar 41, near the two end heads 411, 412 thereof, will be caught and held by the two stoppers 751, 761 so as to prevent the shading sheet 40 from entirely rewing around the revolving sleeve 30. To pullout the shading sheet 40, the user can easily grip the supporter bar 41 rested between the two stoppers 751, 761 and pull out the shading sheet 40.

Generally, the width of revolving sleeve 30 as well as the folding width of the shading sheet 40 is designed to be smaller than a distance between two hinge bars 83, 84 (as shown in FIG. 1) connected to the trunk cover 85 to enable the shading sheet 40 passing therebetween. As shown in FIGS. 1 and 2, the sun shield device 10 is installed inside the trunk 80, the user may first place the sun shield device 10 horizontally inside the trunk 80, and then screw the two supporting shafts 612, 622 out of the central axle 20 respectively and until the two supporting end members 611, 621 respectively firmly pressed against the two interior side walls 81, 82 of the trunk 80 so as to firmly support the sun shield device 10 in position. The user can also make fine adjustment for the position of the revolving sleeve 30 until the revolving sleeve 30 is just aligned between the two hinge bars 83, 84 of the trunk 80. Simply rotating the two supporting shafts 612, 622 in opposite direction can screw them into the central axle 20 so as to un-install the sun shield device 10. As shown in FIGS. 2 and 3, in order to ensure firm supporting between the two interior side walls 81, 82 of the trunk 80 (as shown in FIG. 1), on one of the supporting shafts 612, two parallel locking grooves 613, 614 are provided thereon near the supporting end member 611, so that a spanner or wrench can be engaged on the two parallel locking grooves 613, 164 to turn the supporting shaft 612 for tightly locking the sun shield device 10 in position or unlocking the tightly locked sun shield device 10.

As shown in FIG. 4, after the automobile 8 is parked, the user can simply open the trunk cover 85 and pull the shading sheet 40 from the sun shield device 10 out of the trunk 80 through a gap 87 formed between the opened trunk cover 85 and trunk edge 801 to cover the roof 88 and the front and rear windshields 891, 892 of the automobile 8. The holder 42 can be clipped on the wiper(s) 893 of the automobile 8 so as to secure the shading sheet 40 in the shading condition as shown in FIG. 4. If enough length of the shading sheet 40 is provided, the shading sheet 40 can be extended and secured to the front bumper 861 by means of the holder 42, as illustrated by the phantom lines shown in FIG. 4.

Figure 5:
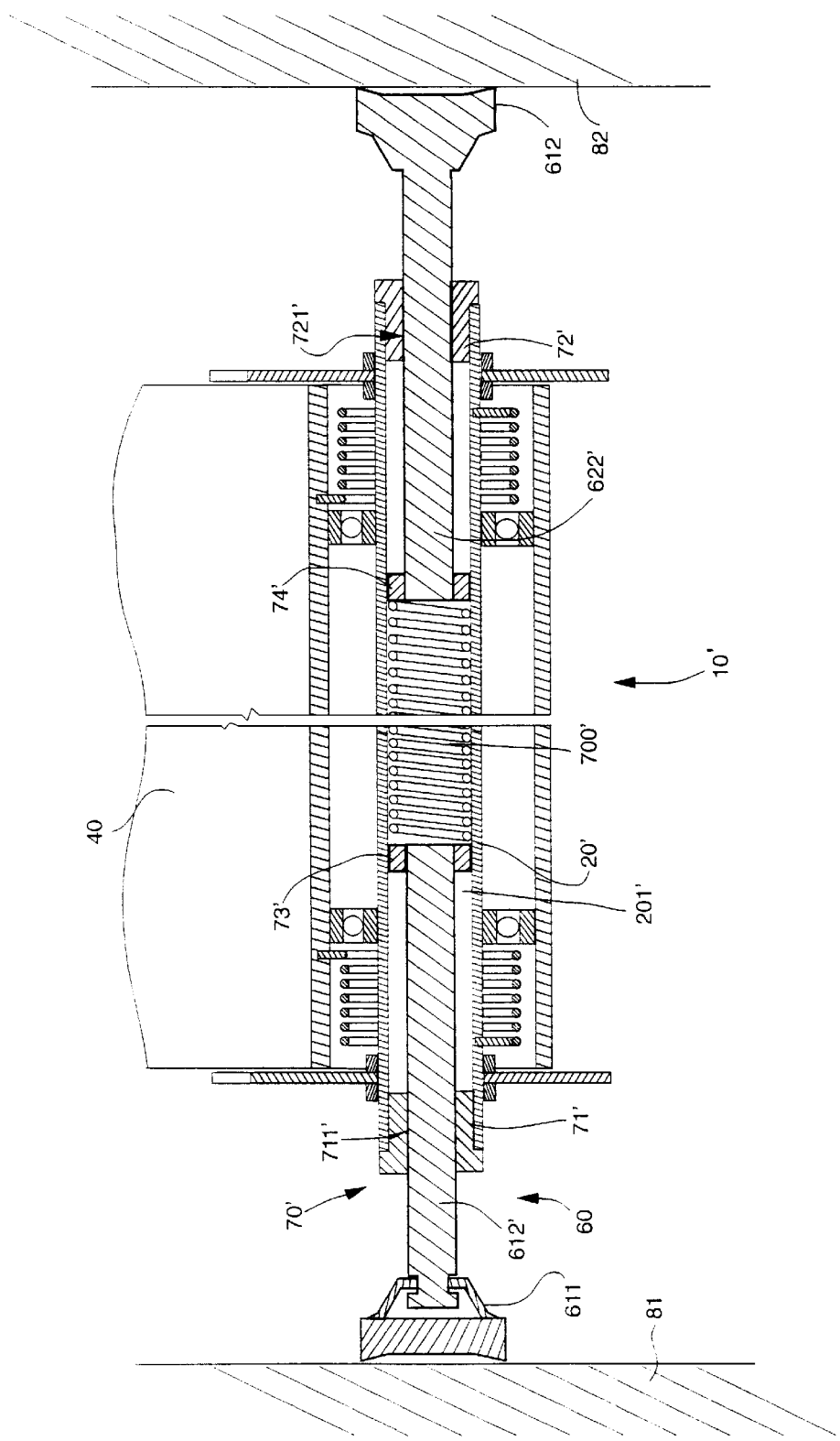
FIG. 5 is a sectional view of a sun shield device according to a second preferred embodiment of the present invention.

As shown in FIG. 5, a second preferred embodiment of the sun shield device 10', wherein the two supporting shafts 612', 622' are simply two rods (no outer thread is provided) slidably inserted into the axial hole 201' of the central axle 20'. The two holding holes 711', 721' of the two holding rings 71', 72' of the adjustment means 70' are flat holes without threads. The adjustment means 70' further comprises a spring 700' positioned inside the axial hole 201' and extended between the two supporting rings 73', 74'. Therefore, the two supporting shafts 612', 622' are normally pressed by the spring 700' to extend out of the central axle 20' until the two supporting rings 73', 74, are stopped by the two holding rings 71', 72'. To install the sun shield device 10', the user may simply compress the two supporting shafts 612', 622' to insert into the central axle 20' until the length of the sun shield device 10 is shorter to the width of the trunk 80. The user may place the sun shield device 10 into the trunk 80. Then, the spring 700' will automatically press the two supporting shafts 612', 622' to extend out of the central axle 20' and the two supporting end members 611', 612' will firmly press against the two interior side walls 81, 82 of the trunk 80 by the spring 700'.

Figure 6:
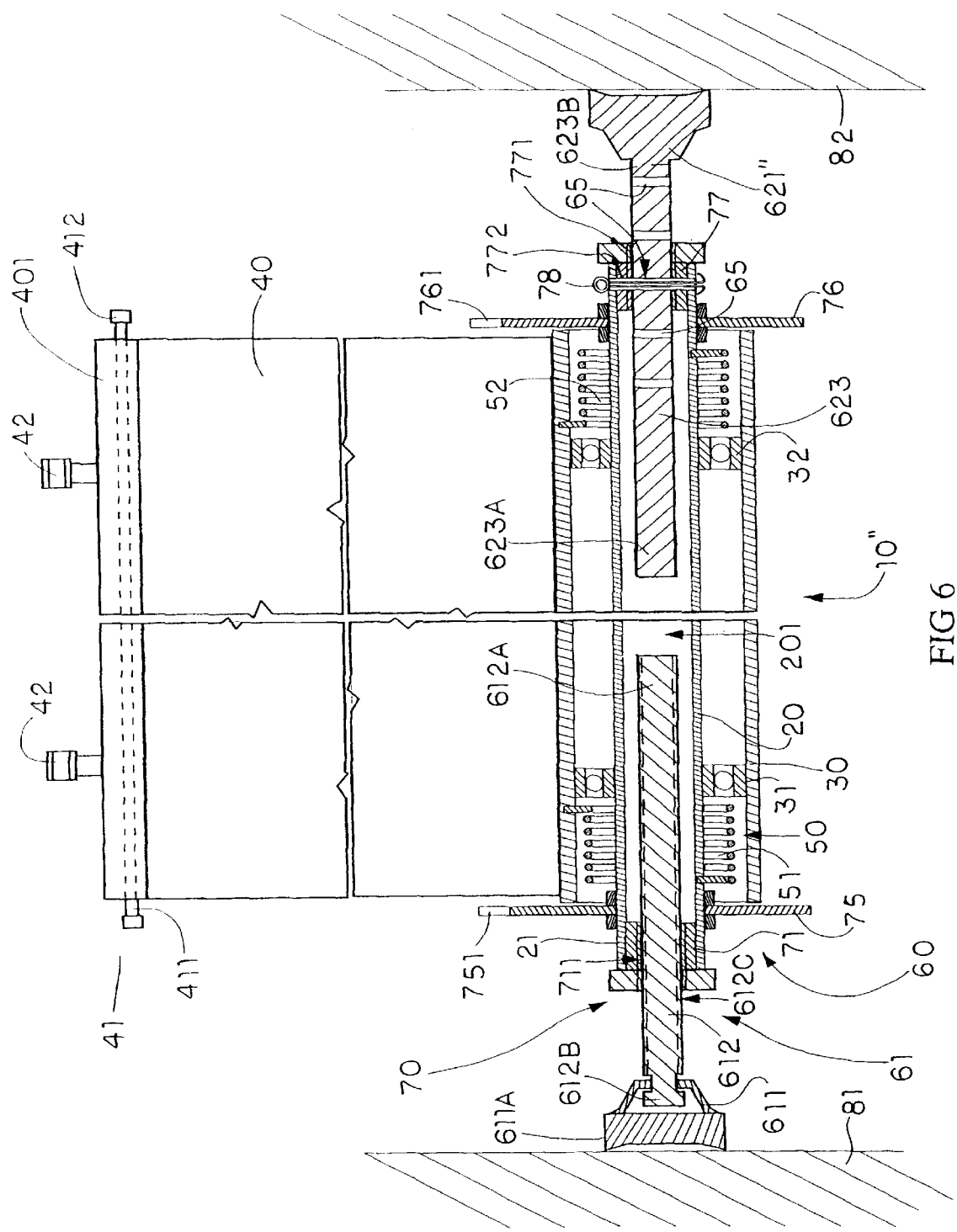
FIG. 6 is a sectional view of a sun shield device according to a third preferred embodiment of the present invention.

As shown in FIG. 6, a third preferred embodiment of a sun shield device 10" is illustrated which is a modification of the above first preferred embodiment that, alternatively, one of the supporting shaft 622 of the supporting means 60 is substituted by a modified supporting shaft 623 while the another supporting shaft 612 remains the same as described in the above first preferred embodiment. According to the third preferred embodiment, the modified supporting shaft 623 has a plurality of through holes 65 spacedly provided thereon, and one of the holding rings 72 of the adjusting means 70 as disclosed in the above first preferred embodiment is correspondingly substituted by a holding rings 77 which merely has a flat axial hole 771 without threads for the modified supporting shaft 623 to slidably insert therethrough into the axial hole 201 of the central axle 20. The holding ring 77 further has a locking hole 772 transversely provided thereon. Moreover, the adjusting means 70 further comprises a locking pin 78 adapted to pass through the locking hole 772 and one of the through holes 65 so as to adjust the extending length of the supporting shaft 623. Similarly, the supporting shaft 623 also has a supporting end member 621" integrally connected with a second end 623b of the supporting shaft 623. According to the third preferred embodiment, the two supporting rings 73, 74 connected to the first ends 612a, 622a of the two supporting shafts 612, 622 as disclosed in the first embodiment are both eliminated to reduce cost. In the other words, a first end 623a of the supporting shaft 623 has no supporting ring connected thereon.

As shown in FIGS. 1, 4 and 6, in order to install the sun shield device 10" of the third preferred embodiment inside the trunk 80, the user may first place the sun shield device 10" horizontally inside the trunk 80 and align the revolving sleeve 30 with the gap 87. Then, slide the supporting shaft 623 out of the central axle 20 until the supporting end member 621" contact with the respective interior wall 82 of the trunk 80. By inserting the locking pin 78 through the locking hole 772 and the respective aligned through holes 65 can locking the supporting shaft 623 in position. Afterwards, screw the supporting shaft 612 with a wrench held onto the two parallel locking grooves 613, 614 to extend the supporting shaft 612 out of the central axle 20 until the two supporting end members 611, 621" are firmly pressed against the two interior walls 81, 82 of the trunk 80 respectively, so as to firmly support the sun shield device 10" between the two hinge bars 83, 84 inside the trunk 80.

Figure 7:
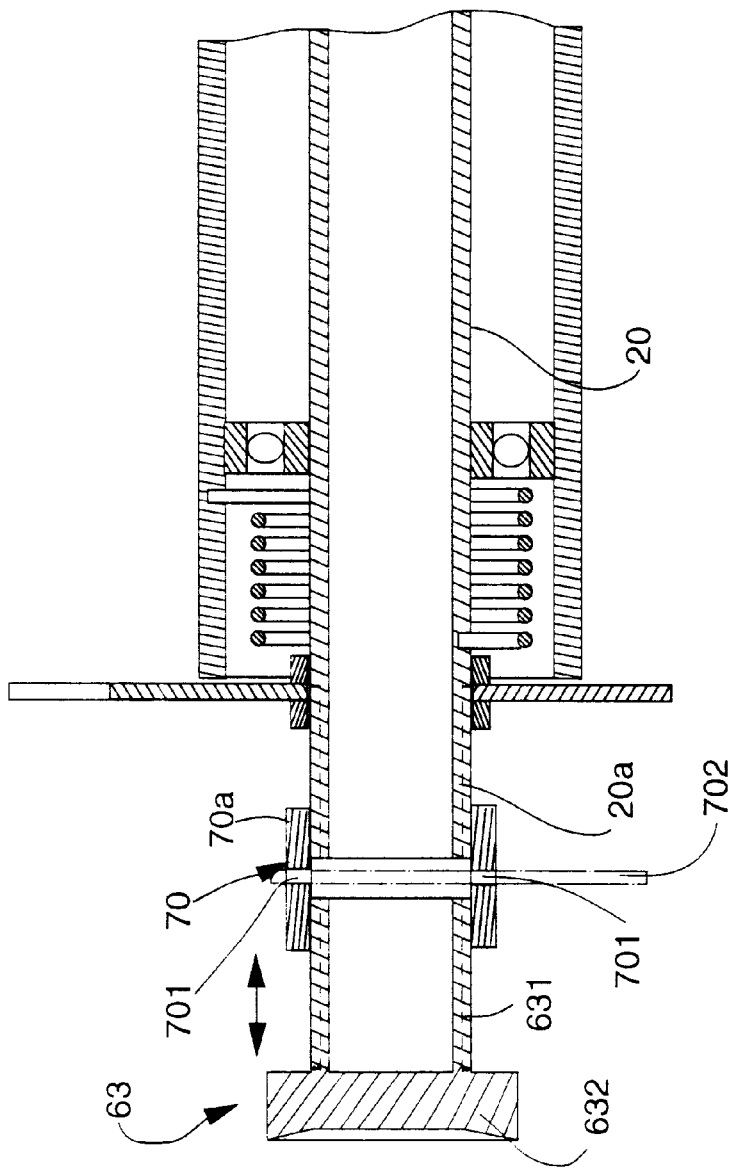
FIG. 7 is a sectional view of an alternative mode of the supporting means of the sun shield device according to the above preferred embodiment of the present invention.

As shown in FIG. 7, an alternative mode of the supporting means 60 is illustrated, wherein each of the supporting shafts 612, 622 as disclosed in the above embodiment is substituted by a supporting bolt 63 which comprises a threaded shank 631 integrally extended from a supporting head 632. Each end of the central axle 20 provides a threaded end portion 20a. The adjusting means 70 comprises two adjusting nuts 70a, wherein each of the threaded shanks 631 and each of the threaded end portions 20a of the central axle 20 are screwed into two ends of the respective adjusting nut 70a. Moreover, a transverse through hole 701 is provided on the adjusting nut 70a so that a turning rod 702 can be penetrated through the through hole 701 for more easily turning the adjusting nut 70a to rotate.

Figure 8:
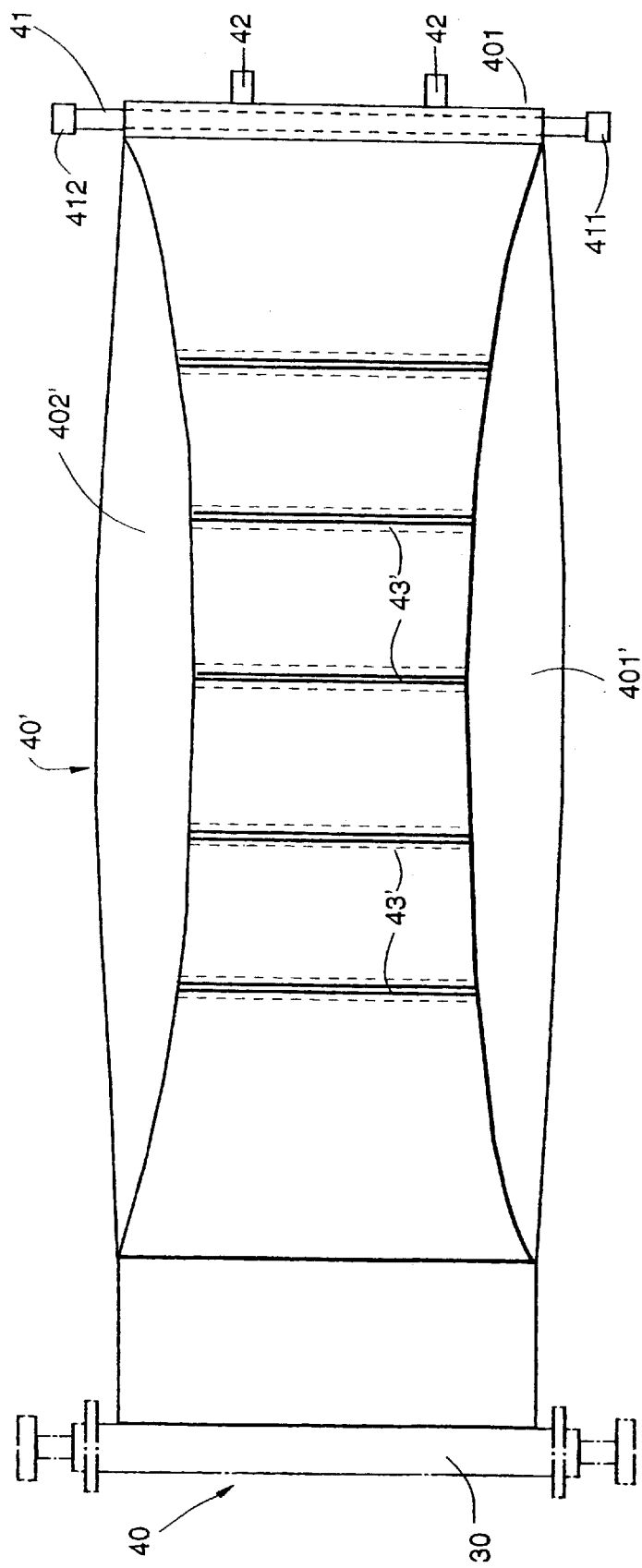
FIG. 8 is a plan view of a first alternative mode of the sun shield device when the shading sheet is entirely extended out according to the above preferred embodiments of the present invention.

As shown in FIG. 8, a first alternative mode of the shading sheet 40' is illustrated, wherein the shading sheet 40' further comprises two wing sheets 401', 402' respectively connected along two sides of the shading sheet 40' for covering the side windows 8a of the automobile 8 when the shading sheet 40' is fully extended to cover the roof 88 of the automobile 8, as shown in FIG. 4. Moreover, a plurality of flexible strengthen strips 43' are transversely attached to the shading sheet 40' intervally. The strengthen strips 43' help the shading sheet 40' to stretch out while it is pulling out. The strengthen strips 43' also help the shading sheet 40' to smoothly rewind around revolving sleeve 30. Furthermore, as shown in FIG. 4, when the shading sheet 40' covers the roof 88 of the automobile 8, the thickness of the strengthen strips 43' forms an air layer between the shading sheet 40' and the roof 88 so as to enhance the heat insulating ability of the shading sheet 40'.

Figure 9:
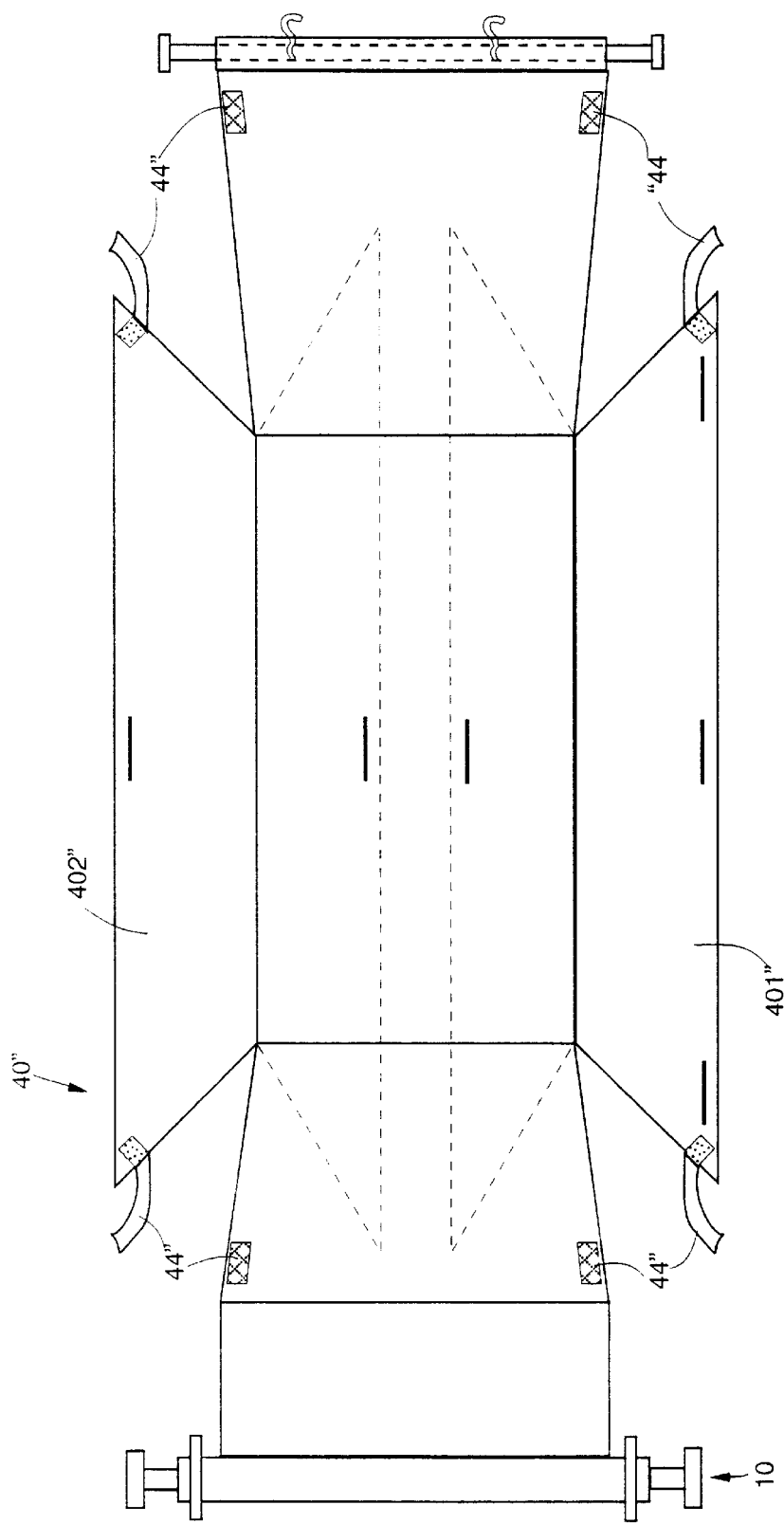
FIG. 9 is a plan view of a second alternative mode of the shading sheet of the sun shield device according to the above preferred embodiments of the present invention.

As shown in FIG. 9, a second alternative mode of the shading sheet 40" is illustrated, wherein two wings sheets 401", 402" are connected with the main shading sheet 40" by hoop and loop fastening means 44".

In view of above, the sun shield device of the present invention substantially achieves the advantages as follows:

(1) The sun shield device for automobile fits to install inside the trunk of various kinds of automobile, so that no additional connecting element such as screw is used so as to avoid the automobile body from being unnecessarily damage.

(2) The driver can install or uninstall the sun shield device rapidly without the need of any tool or technical skill, so that when the driver changes car to drive, he or she may also carry the sun shield device to re-install to the new car.

(3) The sun shield device for automobile can be effectively operated to cover all the window areas and the roof of the automobile in a rapid manner.

(4) The sun shield device for automobile has a compact size and simplified structure that minimizes the manufacturing cost.

What is claimed is:

1. A sun shield device, comprising a tubular central axle;

a revolving sleeve, which has a diameter larger than and a length shorter than that of said central axle, being rotatably supported around said central axle;

a shading sheet engaged on and wound around said revolving sleeve, wherein a supporter bar is transversely affixed to a free end of said shading sheet, said supporter bar having a length longer than a width of said shading sheet and two end heads of said supporter bar being extended out of said two sides of said free end of said shading sheet, at least a holder being connected to said free end of said shading sheet;

an auto-rewinding means for driving said revolving sleeve to rotate so as to automatically rewind said shading sheet around said revolving sleeve;

a supporting means comprising a pair of supporters extendably connected to two ends of said central axle respectively; and an adjusting means for adjusting an extending length of at least one of said supporters so as to adjust an overall length of said sun shield device, wherein by adjusting said length of said sun shield device until two ends of said two supporters firmly pressing against two interior side walls of a trunk of an automobile respectively, said sun shield device is horizontally supported within said trunk;

wherein adjacent to two ends of said revolving sleeve, two guider discs are respectively mounted on said central axle for guiding said winding of said shading sheet around said revolving sleeve, each of said two guider discs having a hook-shaped stopper, wherein when said shading sheet is rewound around said revolving sleeve by means of said auto-rewinding means, said two end heads of said supporter bar are caught and held by said two stoppers so as to prevent said shading sheet from entirely rewound around said revolving sleeve.

2. A sun shield device, as recited in claim 1, wherein said shading sheet further comprises two wing sheets respectively connected along two sides of said shading sheet for covering said side windows of said automobile.

3. A sun shield device, as recited in claim 2, wherein a plurality of flexible strengthen strips are transversely attached to said shading sheet intervally.

4. A sun shield device, comprising a tubular central axle having an axial hole with two ends;

a revolving sleeve, which has a diameter larger than and a length shorter than that of said central axle, being rotatably supported around said central axle;

a shading sheet engaged on and wound around said revolving sleeve;

an auto-rewinding means for driving said revolving sleeve to rotate so as to automatically rewind said shading sheet around said revolving sleeve;

a supporting means comprising a pair of supporters extendably connected to two ends of said central axle respectively, wherein each of said two supporters comprises a supporting shaft which has a first end and a second end, said two first ends of said two supporting shafts being respectively inserted into said axial hole of said central axle through said two ends thereof, said two second ends of said two supporting shafts being connected with two supporting end members respectively, wherein each of said two supporting end members has an enlarged supporting head; and an adjusting means for adjusting an extending length of at least one of said supporters so as to adjust an overall length of said sun shield device, wherein said adjustment means comprises two holding rings respectively engaged to said two ends of said central axle, each of said holding rings having a holding hole which has a diameter equal to that of said two supporting shafts, wherein said two supporting shafts respectively pass through said two holding rings, wherein by adjusting said length of said sun shield device until two ends of said two supporters firmly pressing against two interior side walls of a trunk of an automobile respectively, said sun shield device is horizontally supported within said trunk;

wherein each of said two supporting shafts is provided with outer threads along the length thereof, and each of said holding holes of said two holding rings is a threaded hole, wherein said two supporting shafts are respectively screwed through said two threaded holding holes of said two holding rings;

wherein a supporter bar is transversely affixed to a free end of said shading sheet, said supporter bar having a length longer than a width of said shading sheet and two end heads of said supporter bar being extended out of said two sides of said free end of said shading sheet, at least a holder being connected to said free end of said shading sheet, wherein adjacent to two ends of said revolving sleeve, two guider discs are respectively mounted on said central axle for guiding said winding of said shading sheet around said revolving sleeve, each of said two guider discs having a hook-shaped stopper, wherein when said shading sheet is rewound around said revolving sleeve by means of said auto-rewinding means, said two end heads of said supporter bar are caught and held by said two stoppers so as to prevent said shading sheet from entirely rewound around said revolving sleeve.

5. A sun shield device, as recited in claim 4, wherein said shading sheet further comprises two wing sheets respectively connected along two sides of said shading sheet for covering said side windows of said automobile.

6. A sun shield device, as recited in claim 5, wherein a plurality of flexible strengthen strips are transversely attached to said shading sheet intervally.

7. A sun shield device, comprising a tubular central axle having an axial hole with two ends;

a revolving sleeve, which has a diameter larger than and a length shorter than that of said central axle, being rotatably supported around said central axle;

a shading sheet engaged on and wound around said revolving sleeve;

an auto-rewinding means for driving said revolving sleeve to rotate so as to automatically rewind said shading sheet around said revolving sleeve;

a supporting means comprising a pair of supporters extendably connected to two ends of said central axle respectively, wherein each of said two supporters comprises a supporting shaft which has a first end and a second end, said two first ends of said two supporting shafts being respectively inserted into said axial hole of said central axle through said two ends thereof, said two second ends of said two supporting shafts being connected with two supporting end members respectively, wherein each of said two supporting end members has an enlarged supporting head; and an adjusting means for adjusting an extending length of at least one of said supporters so as to adjust an overall length of said sun shield device, wherein said adjustment means comprises two holding rings respectively engaged to said two ends of said central axle, each of said holding rings having a holding hole which has a diameter equal to that of said two supporting shafts, said two supporting shafts respectively passing through said two holding rings, wherein said adjustment means further comprises a spring positioned inside said axial hole and extended between said two supporting rings, wherein by adjusting said length of said sun shield device until two ends of said two supporters firmly pressing against two interior side walls of a trunk of an automobile respectively, said sun shield device is horizontally supported within said trunk;

wherein a supporter bar is transversely affixed to a free end of said shading sheet, said supporter bar having a length longer than a width of said shading sheet and two end heads of said supporter bar being extended out of said two sides of said free end of said shading sheet, at least a holder being connected to said free end of said shading sheet, wherein adjacent to two ends of said revolving sleeve, two guider discs are respectively mounted on said central axle for guiding said winding of said shading sheet around said revolving sleeve, each of said two guider discs having a hook-shaped stopper, wherein when said shading sheet is rewound around said revolving sleeve by means of said auto-rewinding means, said two end heads of said supporter bar are caught and held by said two stoppers so as to prevent said shading sheet from entirely rewound around said revolving sleeve.

8. A sun shield device, as recited in claim 7, wherein said shading sheet further comprises two wing sheets respectively connected along two sides of said shading sheet for covering said side windows of said automobile.

9. A sun shield device, as recited in claim 8, wherein a plurality of flexible strengthen strips are transversely attached to said shading sheet intervally.

10. A sun shield device, comprising a tubular central axle having an axial hole with two ends;

a revolving sleeve, which has a diameter larger than and a length shorter than that of said central axle, being rotatably supported around said central axle;

a shading sheet engaged on and wound around said revolving sleeve;

an auto-rewinding means for driving said revolving sleeve to rotate so as to automatically rewind said shading sheet around said revolving sleeve;

a supporting means comprising a pair of supporters extendably connected to two ends of said central axle respectively, wherein each of said two supporters comprises a supporting shaft which has a first end and a second end, said two first ends of said two supporting shafts being respectively inserted into said axial hole of said central axle through said two ends thereof, said two second ends of said two supporting shafts being connected with two supporting end members respectively, wherein each of said two supporting end members has an enlarged supporting head; and an adjusting means for adjusting an extending length of at least one of said supporters so as to adjust an overall length of said sun shield device, wherein said adjustment means comprises two holding rings respectively engaged to said two ends of said central axle, each of said holding rings having a holding hole which has a diameter equal to that of said two supporting shafts, wherein said two supporting shafts respectively pass through said two holding rings, wherein by adjusting said length of said sun shield device until two ends of said two supporters firmly pressing against two interior side walls of a trunk of an automobile respectively, said sun shield device is horizontally supported within said trunk;

wherein one of said two supporting shafts is a threaded supporting shaft provided with outer threads along the length thereof, and said holding hole of said respective holding ring is a threaded holding hole, wherein said threaded supporting shaft is respectively screwed through said threaded holding hole of said respective holding ring, wherein said another supporting shaft has a plurality of through holes intervally and transversely provided thereon, and said another respective holding ring has a locking hole transversely provided therethrough, wherein said adjusting means comprises a locking pin adapted to pass through said respective locking hole and one of said through holes so as to adjust an extending length of said another supporting shaft;

wherein a supporter bar is transversely affixed to a free end of said shading sheet, said supporter bar having a length longer than a width of said shading sheet and two end heads of said supporter bar being extended out of said two sides of said free end of said shading sheet, at least a holder being connected to said free end of said shading sheet, wherein adjacent to twp ends of said revolving sleeve, two guider discs are respectively mounted on said central axle for guiding said winding of said shading sheet around said revolving sleeve, each of said two guider discs having a hook-shaped stopper, wherein when said shading sheet is rewound around said revolving sleeve by means of said auto- rewinding means, said two end heads of said supporter bar are caught and held by said two stoppers so as to prevent said shading sheet from entirely rewound around said revolving sleeve.

11. A sun shield device, as recited in claim 10, wherein said shading sheet further comprises two wing sheets respectively connected along two sides of said shading sheet for covering said side windows of said automobile.

12. A sun shield device, as recited in claim 11, wherein a plurality of flexible strengthen strips are transversely attached to said shading sheet intervally.

* * * * *